3,150,103
METHOD FOR REMOVING VANADIUM AND NICKEL FROM A SILICA BASED CATALYST

Arvin D. Anderson, Anaheim, Calif., assignor, by mesne assignments, to Sinclair Research, Inc., New York, N.Y., a corporation of Delaware
No Drawing. Filed Sept. 12, 1960, Ser. No. 55,160
14 Claims. (Cl. 252—412)

This invention concerns the removal of vanadium and other poisoning metals from a synthetic gel hydrocarbon conversion catalyst which has been contaminated with vanadium and perhaps other metals by use in the high temperature catalytic conversion of feedstocks containing vanadium. The invention is designed for use as part of an overall metals removal procedure employing a plurality of processing steps to increase the amount of vanadium removable by such procedures. The invention comprises subjecting the catalyst, after regeneration, to treatment with a gas comprising molecular oxygen at an elevated temperature, preferably higher than the regeneration temperature, and removing vanadium from the catalyst. In this treatment essentially carbon-free catalyst is contacted with the oxygen-containing gas for a time to convert a significant amount of the vanadium on the catalyst to a higher valence state.

Copending patent applications Serial Nos. 763,834, filed September 29, 1958; 842,618, filed September 28, 1959; 849,199, filed October 28, 1959 (all of which are now abandoned); and 39,810, filed June 30, 1960, describe procedures by which vanadium and other poisoning metals included in a solid oxide hydrocarbon conversion catalyst are removed by dissolving them from the catalyst or subjecting the catalyst, outside the hydrocarbon conversion system, to elevated temperature conditions which put the metal contaminants into the chloride, sulfate or other volatile, water-dispersible or more available form. This invention provides for greater vanadium removal when practiced in conjunction with these and other procedures. This application is a continuation-in-part of application Serial No. 19,313, filed April 1, 1960, now abandoned.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e., liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g., silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalysts systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½″ in diameter. When fresh, the minimum sized bead is generally about ⅛″. Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form.

Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. Thus Venezuelan crudes or their fractions make ideal feeds for the present process when the demetallization is essentially the treatment with an oxygen-containing gas at a high temperature along with other steps designed primarily for vanadium removal. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of butane, butylenes and gasoline, based on converting 60 volume percent of cracking feed to lighter materials and coke dropped from 58.5 to 49.6 volume percent when the amount of nickel on the catalyst increased from 55 p.p.m. to 645 p.p.m. and the amount of vanadium increased from 145 p.p.m. to 1480 p.p.m in fluid catalytic cracking of a feedstock containing some metal contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by rasing catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

A further alternative, demetallizing the catalyst, which avoids discarding of expensive catalyst and enables much lower grade, highly metals contaminated feedstocks to be used, is now possible in this invention. In my process a catalyst contaminated with vanadium by use in converting a vanadium-containing petroleum feedstock may be treated only for vanadium removal, or the catalyst may be treated for nickel and/or iron removal as well.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253; 2,488,718; 2,488,744; 2,668,798 and 2,693,455, the process of this invention is effective to remove vanadium and other metals without endangering the expensive catalyst.

In this invention the hydrocarbon petroleum oils utilized as feedstock for a conversion process may be of any desired type normally utilized in catalytic conversion operations. This feedstock contains vanadium, sometimes as much as 3%, and the catalyst may be used as a fixed, moving or fluidized bed or may be in a more dispersed state. For typical operations, the catalytic cracking of the hydrocarbon feed would normally result in a conversion of about 50 to 60% of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure.

In this invention the essentially carbon-free, vanadium poisoned catalyst is contacted with an oxygen-containing gas for a time sufficient to convert a significant amount of the vanadium on the catalyst to the higher valence state. Ordinarily, the catalysts are treated before the poisoning metals have reached an undesirably high level, for instance, about 2%, generally no more than about 1% maximum, content of vanadium. Prior to oxygen treatment, subjecting the poisoned catalyst sample to magnetic flux may be found desirable to remove any tramp iron particles which may have become mixed with the catalyst.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 5.0%, generally less than about 0.5%.

Treatment of the regenerated catalyst with molecular oxygen-containing gas is preferably at a temperature at least about 50° F. higher than the regeneration temperature that is, the average temperature at which the major portion of carbon is removed from the catalyst. The temperature of treatment with molecular oxygen-containing gas will generally be in the range of about 1000 to 1800° F. but below a temperature where the catalyst undergoes any substantial deleterious change in its physical or chemical characteristics. The catalyst, as pointed out, is in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment.

The treatment of the vanadium-poisoned catalyst with molecular oxygen-containing gas is preferably performed at a temperature of about 1150 to 1350 or even as high as 1600° F. Little or no effect on vanadium removal is accomplished by treatment at temperatures significantly below about 1000° F., even for an extended time. The upper temperature, to avoid undue catalyst damage, will usually not materially exceed about 1600 or 1800° F.

The duration of the oxygen treatment and the amout of vanadium prepared by the treatment for subsequent removal is dependent upon the temperature and the characteristics of the equipment used. The length of the oxygen treatment may vary from the short time necessary to produce an observable effect in the later treatment say, a quarter of an hour to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness has been observed after about four hours of treatment.

The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen. The treatment is not prolonged to a point where the catalyst will be damaged. The maximum practical time of treatment will vary from about 4 to 24 hours, depending on the type of equipment used.

The catalyst may pass directly from the oxygen treatment to a vanadium removal treatment especially where this is the only important contaminant, as may be the case when a feed is derived, for example, from Venezuelan crude. Such treatment may be a basic aqueous wash such as described in copending patent applications Serial No. 767,794, filed October 17, 1958, now abandoned, and Serial No. 39,810, filed June 30, 1960, both of which applications are incorporated herein by reference. Alternatively vanadium may be removed by a chlorination procedure as described in copending application Serial No. 849,199, filed October 28, 1959, and also incorporated herein by reference.

Vanadium may be removed from the catalyst after the high temperature treatment with molecular oxygen-containing gas by washing it with a basic aqueous solution. The pH is frequently greater than about 7.5 and preferably the solution contains ammonium ions. The solution preferably is substantially free, before contact with the catalyst, of any contaminant materials which would remain deposited on the catalyst. The ammonium ions may be $NH_4^+$ ions or organic-substituted $NH_4^+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the ammonium wash the catalyst slurry can be filtered to give a cake which may be reslurried with water or rinsed in other ways, such as, for example, by a water wash on the filter, and the rinsing may be repeated, if desired, several times. A repetition of the ammonium wash without other treatments seems to have little effect on vanadium removal if the first washing has been properly conducted but repetition of the basic aqueous ammonium wash after a repeated high temperature oxygen treatment usually does serve to further diminish the vanadium content of the catalyst.

Alternatively, after the high temperature treatment with oxygen-containing gas, treatment of a metals contaminated catalyst with a chlorinating agent at a moderately elevated temperature is of value in removing vanadium and iron contaminants from the catalyst as volatile chlorides. This treatment is described in copending application Serial No. 849,199, filed October 28, 1959. Generally, the major proportion of these volatile chlorides is removed during contact with the chlorinating vapor and where the volatile chlorides are insufficiently removed, a purge with an inert gas such as nitrogen at an elevated temperature may be applied to the chlorinated catalyst. The basic aqueous ammonium wash may be used as a substitute or complement to such a purge.

A conversion to vanadium chloride after the high temperature oxygen treatment preferably makes use of vapor phase chlorination at a moderately elevated temperature, up to about 700° or even 1000° F., where in the catalyst composition and structure is not materially harmed by the treatment and a substantial amount of the poisoning metals content is converted to chlorides. The conversion to chloride may be performed after sulfiding the poisoning metals, as described below. The chlorination takes place at a temperature of at least about 300° F., preferably about 550 to 650° F. with optimum results usually being obtained near 600° F. The chlorinating agent is essentially anhydrous, that is, if changed to the liquid state no separate aqueous phase would be observed in the reagent.

The chlorinating reagent is a vapor which contains chlorine or sometimes HCl, preferably in combination with carbon or sulfur. Such reagents include molecular chlorine but preferably are mixtures of chlorine with, for example, a chlorine substituted light hydrocarbon, such as carbon tetrachloride, which may be used as such or formed in situ by the use of, for example, a vaporous mixture of chlorine gas with low molecular weight hydrocarbons such as methane, n-pentane, etc.

The stoichiometric amount of chlorine required to convert iron, nickel and vanadium to their most highly chlorinated compounds is the minimum amount of chlorine ordinarily used and may be derived from free chlorine, combined chlorine or the mixture of chlorine with a chlorine compound promoter described above. However, since the stoichiometric amount of chlorine frequently is in a neighborhood of only 0.001 g./g. of catalyst, a much larger amount of chlorine, say about 1–40 percent active chlorinating agent based on the weight of the catalyst is generally used. The amount of chlorinating agent required is increased if any significant amount of water is present on the catalyst so that substantially anhydrous conditions preferably are maintained as regards the catalyst as well as the chlorinating agent. The promoter is generally used in the amount of about 1–5 or 10 percent or more, preferably about 2–3 percent, based on the weight of the catalyst for good metals removal; however, even if less than this amount is used, a considerable improvement in metals conversion is obtained over that which is possible at the same temperature using chlorine alone. The amount of promoter may vary depending upon the manipulative aspects of the chlorination step, for example, a batch treatment may sometimes require less promoter than in a continuous treatment for the same degree of effectiveness and results. The chlorine and promoter may be supplied individually or as a mixture to a poisoned catalyst. Such a mixture may contain about 0.1 to 50 parts chlorine per part of promoter, preferably about 1–10 parts per part of promoter. A chlorinating gas comprising about 1–30 weight percent chlorine, based on the catalyst, together with one percent or more $S_2Cl_2$ gives good results. Preferably, such a gas provides 1–10 percent $Cl_2$ and about 1.5 percent $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$:5–10 parts $Cl_2$ or HCl.

Conveniently, a pressure of about 0–100 or more p.s.i.g., preferably about 0–15 p.s.i.g. may be maintained in chlorination. The chlorination may take about 5 to 120 minutes, more usually about 20 to 60 minutes, but shorter or longer reaction periods may be possible or needed, for instance, depending on the linear velocity of the chlorinating and purging vapors.

The process of this invention, as pointed out above, is of particular value in the demetallization of catalysts containing vanadium poisons. The removal of vanadium after the high temperature treatment with molecular oxygen-containing gas may be performed by dissolving the vanadium compounds and/or by converting the compounds to volatile and/or soluble vanadium compounds, such as by the chlorination process above described. In addition, the high temperature treatment of this invention may be employed in processes designed for the removal of other poisoning metals, such as nickel, as well as vanadium. Such processes may remove nickel, again, by dissolving nickel compounds directly from the catalyst and/or by converting the nickel compounds to volatile materials and/or materials soluble or dispersible in an aqueous medium, e.g., water or dilute acid.

The water-dispersible form may be one which decomposes in water to produce water-soluble products. The removal procedure for the converted metal may be based on the form to which the metal is converted. The mechanism of the washing steps may be one of simultaneous conversion of nickel and/or vanadium to salt form and removal by the aqueous wash; however, this invention is not to be limited by such a theory.

Conversion of some of the metal poisons especially nickel, to the sulfate or other water-dispersible form is described in copending applications Serial No. 763,834, filed September 29, 1958, and Serial No. 842,618, filed September 28, 1959, and may be accomplished, for instance, by subjecting the catalyst to a sulfating gas, that is $SO_2$, $SO_3$ or a mixture of $SO_2$ and $O_2$, at an elevated temperature. Sulfur oxide contact is usually performed at a temperature of about 500 to 1200° F. and frequently it is advantageous to include some free oxygen in the treating gas. Another procedure includes sulfiding the catalyst and converting the sulfide by an oxidation process, after which metal contaminants in water-dispersible form, preferably prior to the ammonium wash may be dissolved from the catalyst by an aqueous medium.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g., batch or continuous, as well as the rate of diffusion within the catalyst matrix. The sulfiding step performs the function not only of supplying a sulfur-containing metal compound which may be easily converted to the sulfate or other water-soluble form but also appears to concentrate some metal poisons, especially nickel, at the surface of the catalyst particle.

Oxidation after sulfiding may be performed by a gaseous oxidizing agent to convert metal sulfide to sulfate, including oxysulfate, or other water-dispersible form. Gaseous oxygen, or mixtures of gaseous oxygen with inert gases such as nitrogen, may be brought into contact with the sulfided catalyst at an oxygen partial pressure of about 0.2 atmospheres and upward, temperatures upward of room temperature and usually not above about 1300° F., and times dependent on temperature and oxygen partial pressure. Gaseous oxidation is best carried out near 900° F., about one atmosphere $O_2$ and at very brief contact times.

The metal sulfide may be converted to the corresponding sulfate, or other water-dispersible form, by a liquid aqueous oxidizing agent such as a dilute hydrogen peroxide or hypochlorous acid water solution, as described in copending application Serial No. 842,618, filed September 28, 1959. The inclusion in the liquid aqueous oxidizing solution of sulfuric acid or nitric acid has been found greatly to reduce the consumption of peroxide. In addition the inclusion of nitric acid in the oxidizing solution provides for increased vanadium removal. Useful proportions of acid to peroxide to catalyst generally include about 2 to 25 pounds acid (on a 100% basis) to about 1 to 30 pounds or more $H_2O_2$ (also on a 100% basis) in a very dilute aqueous solution, to about one ton of catalyst. A 30% $H_2O_2$ solution in water seems to be an advantageous raw material for preparing the aqueous oxidizing solution. Sodium peroxide or potassium peroxide may be used in place of hydrogen peroxide and in such circumstances, enough extra sulfuric or nitric acid may be used to provide one mole of sulfate or two moles of nitrate for each two moles of sodium or potassium.

Another highly advantageous oxidizing medium is an aerated dilute nitric acid solution in water. Such a solution may be provided by continuously bubbling air into a slurry of the catalyst in very dilute nitric acid. Other oxygen-containing gases may be substituted for air. Varying oxygen partial pressure in the range of about 0.2 to 1.0 atmosphere appears to have no effect in time required for oxidation, which is generally at least about 7 to 8 minutes. The oxidizing slurry may contain about 20% solids and provide about five pounds of nitric acid per ton of catalyst. Studies have shown a greater concentration of $HNO_3$ to be of no significant advantage. Other oxidizing agents, such as chromic acid where a small residual $Cr_2O_3$ content in the catalyst is not significant, and similar aqueous oxidizing solutions such as water solutions of manganates and permanganates, chlorites, chlorates and perchlorates, bromites, bromates and perbromates, iodites, iodates and periodates, are also useful. Bromine or iodine water, or aerated, ozonated or oxygenated water, with or without acid, also will oxidize the sulfides to sulfate or other dispersible form. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found.

After conversion of nickel sulfide to a dispersible form, the catalyst is washed with an aqueous medium to remove metal sulfate, nitrate, etc. This aqueous medium, for best removal of nickel is generally somewhat acidic, and this condition may be brought about, at least initially, by the presence of an acid-acting salt or some entrained acidic oxidizing agent on the catalyst. The aqueous medium can contain extraneous ingredients in trace amounts, so long as the medium is essentially water and the extraneous ingredients do not interfere with remetallization or adversely affect the properties of the catalyst. Ambient temperatures can be used in the wash but temperatures of about 150° F. to the boiling point of water are sometimes helpful. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from a chlorinated catalyst, contact time in this stage is preferably held to about 3 to 5 minutes which is sufficient for nickel removal. Also, since a slightly acidic solution is desirable for nickel removal, this wash preferably takes place before the ammonium wash.

Alternative to the removal of poisoning metals by procedures involving contact of the sulfided or sulfated catalyst with aqueous media, nickel poison and some iron may be removed through conversion of the nickel sulfide to the volatile nickel carbonyl by treatment with carbon monoxide, as described in copending application Serial No. 47,598, filed August 4, 1960, incorporated herein by reference. In such a procedure the catalyst is treated with hydrogen at an elevated temperature during which nickel contaminant is reduced to the elemental state, then treated, preferably under elevated pressure and at a lower temperature with carbon monoxide, during which nickel carbonyl is formed and flushed off the catalyst surface. Some iron contaminant is also removed by this carbonylation treatment.

Hydrogenation takes place at a temperature of about 800 to 1600° F., at a pressure from atmospheric or less up to about 100 p.s.i.g. with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation is continued until surface accumulations of poisoning metals, particularly nickel, are substantially reduced to the elemental state.

Carbonylation takes place at a temperature substantially lower than the hydrogenation, from about ambient temperature to 300° F. maximum and at a pressure up to about 2000 p.s.i.g., with a gas containing about 50–100 mole percent CO. Preferred conditions include greater than about 90 mole percent CO, a pressure of up to about 800 p.s.i.g. and a temperature of about 100–180° F. The CO treatment serves generally both to convert the elemental metals, especially nickel and iron to volatile carbonyls and to remove the carbonyls.

After the ammonium wash, or after the final treatment which may be used in the catalyst demetallization procedure, the catalyst is conducted to its conversion system, for instance to the hydrocarbon conversion reactor or the catalyst regenerator, although it may be desirable first to dry a wet catalyst filter cake or filter cake slurry at say about 250 to 450° F. and also, prior to reusing the catalyst in the conversion operation it can be calcined, say at temperatures usually in the range of about 700 to 1300° F. Prolonged calcination of the catalyst at above about 1100° F. may sometimes be disadvantageous. Calcination removes free water, if any be present, and perhaps some but not all of the combined water, and leaves the catalyst in an active state without undue sintering of its surface. Inert gases frequently may be employed after contact with reactive vapors to remove any of these vapors entrained in the catalyst or to purge the catalyst of reaction products.

The demetallization procedure of this invention has been found to be highly successful when used in conjunction with fluidized catalyst hydrocarbon conversion systems to control the amount of metal poisons on the catalyst. When such catalysts are processed, a fluidized solids technique is recommended for these vapor contact demetallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time may have relatively little effect on the catalytic activity of the depoisoned catalyst, although further metals content may be removed by repeated or other treatments.

The actual time or extent of treating depends on various factors and is controlled by the operator according to the situation he faces, e.g., the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. vanadium will be accumulated on the catalyst before demetallization is warranted. A suitable amount, generally a very small portion of the catalyst, is removed from the hydrocarbon conversion system and given the oxygen treatment after the oxidation regeneration which serves to remove carbonaceous deposits. With a continuously circulating catalyst stream, such as in the ordinary "fluid" system this may conveniently be done by the intermittent or continuous removal of a slip-stream of catalyst from the regenerator standpipe. The severity of regeneration is generally such that the catalyst sent to demetallization contains not more than about 0.5% carbon. Where the catalyst is sent to the high temperature treatment with molecular oxygen-containing gas before it is substantially carbon-free, the length of oxygen treatment, as recited above, is reckoned from the time that the catalyst reaches the substantially carbon-free state, that is the state where little, if any, carbon is burned or oxygen consumed even when the catalyst is contacted with oxygen at temperatures conducive to combustion.

The amount of Ni, V or Fe removed in practicing the procedures outlined or the proportions of each which are removed may be varied by proper choice of treating conditions. It may prove necessary, in the case of very severely poisoned catalysts, to repeat one or more treatments to reduce the metals to an acceptable level, perhaps with variations where one metal is greatly in excess. A further significant advantage of the process lies in the fact that the overall metals removal operation, even if repeated, does not unduly deleteriously affect the activity, selectivity, pore structure and other desirable characteristics of the catalyst.

In practice the process could be applied in a refinery by removing a portion of catalyst from the regenerator or regenerator standpipe of the cracking system after a standard regeneration treatment to remove a good part of the carbon, heating this portion of the catalyst inventory, at least about 50° F. higher than the average regeneration temperature, in air for the length of time found to be sufficient for vanadium removal without catalyst damage, then sulfiding the catalyst. Subsequent treatment may be based upon removal of poisons as vapors, by chlorination and carbonylation, or may be based upon aqueous removal by the use of an ammonium wash or may be based upon aqueous removal by conversion, through chlorination, perhaps preceded by sulfidation, and removal by suitable aqueous washes. The treated catalyst can be returned to the unit, for example, to the regenerator, reducing greatly the new catalyst requirement.

The following examples are illustrative of the invention but should not be considered limiting.

EXAMPLE I

This example illustrates the use of high temperature oxygen treatment with sulfiding and direct aqueous removal of metal poisons. Base catalyst Q was a "Nalcat" synthetic gel silica-alumina finely divided fluid-type cracking catalyst composed of about 25% $Al_2O_3$, substantially the rest $SiO_2$. It was used in a commercial catalytic cracking conversion unit, using conventional fluidized catalyst techniques, including cracking and air regeneration to convert a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend had a gravity (API) of 24°, a carbon residue of about 0.3 weight percent and a boiling range of about 500 to 1000° F. When this catalyst had an iron content of 2880 p.p.m., a nickel content of 328 p.p.m. and a vanadium content of 4320 p.p.m., measured as the common oxides, a portion was removed from the cracking system after regeneration at about 1100° F.

A 200 g. sample of this catalyst is heated for 2 hours at 1300° F., 200° F. higher than the regeneration temperature, in a bed fluidized with air, followed by stripping with nitrogen. The stripped catalyst is then heated in a bed fluidized with hydrogen sulfide for 1 hour at 1175° F., cooled to 600° F. in inert gas, and discharged into 800 ml. of an aqueous solution containing 3.52 g. ethylene diamine tetraacetic acid and 7 ml. concentrated $NH_4OH$ (1.82 g. $NH_3$). The resulting slurry is maintained at 200–210° F., with stirring, while finely dispersed air is passed through the slurry for one hour. The slurry is then filtered, washed free of soluble metal compounds and returned to the catalytic cracking unit. Substantial reduction of all contaminating metals is obtained.

EXAMPLE II

This example illustrates the use of high temperature oxygen treatment with sulfiding and oxidation of sulfides, along with vanadium removal by a basic aqueous medium. A fluid synthetic cracking base catalyst R, heavily contaminated with metals deposited during use, and regenerated at about 1100° F., is heated for 2 hours at 1300° F. in a bed fluidized with air. The catalyst is purged wtih nitrogen while cooling to 1175° F. and then held for one hour at 1175° F. in a bed fluidized with $H_2S$. The sulfided catalyst is cooled to 500° F. under a blanket of inert gas and then fluidized with a stream of 90% steam and 10% air for 15 minutes at this 500° F. temperature. The oxidized catalyst is discharged into an aqueous solution of nitric acid providing five pounds of $HNO_3$ per ton of catalyst, the slurry solids content being 10% by weight; and stirred for five minutes. The slurry is then filtered and washed free of soluble metal compounds. The washed catalyst is then slurried for 10 minutes in an aqueous solution of $NH_4OH$ equivalent to 10 pounds $NH_3$ per ton of catalyst. This slurry is filtered and the cake washed free of soluble vanadium compounds.

EXAMPLE III

This example illustrates the use of high temperature treatment with oxygen-counting gas at a temperature at least about 50° F. higher than the 1100° F. regeneration temperature, along with sulfiding and removal of metal contaminants as vapors. A batch of base catalyst Q subjected to magnetic flux for iron removal, was used to test crack a petroleum hydrocarbon East Texas gas oil fraction (feedstock B) having the following approximate characteristics:

| | |
|---|---|
| IBP (° F.) | 490–510 |
| 10% | 530–550 |
| 50% | 580–600 |
| 90% | 650–670 |
| EP | 690–710 |
| Gravity (API) degrees | 33–35 |
| Viscosity (SUS) at 100° F. | 40–45 |
| Aniline point ° F. | 170–175 |
| Pour Point ° F. | 35–40 |
| Sulfur percent | 0.3 |

A 3000 gram sample of this base poisoned catalyst was treated by air at 1300° F. for 4 hours. This catalyst sample was then cooled to 1175° F. at which temperature it was sulfided with $H_2S$ for 1½ hours. The removal of vanadia and iron was next accomplished by treating this catalyst at 600° F. with 5% $CCl_4$ and 2% $Cl_2$ (both based on the weight of the catalyst) for 1 hour. The 1.3% residual chlorine left on the catalyst was removed by treatment at 900° F. for 6 hours with a stream of hydrogen containing 3% $H_2O$. This treatment served to lower the chloride value to less than 0.005%. The catalyst was then purged for sixty minutes with dry hydrogen at 900° F. to remove excess moisture and reduce the nickel chloride on the catalyst. It was then subjected to a carbon monoxide treat at 180° F. and 800 p.s.i.g. for 6 hours to remove nickel from the catalyst surface as a carbonyl. The following Table I gives the results of this treatment and also the results of the test cracking of feedstock B by the catalyst before and after demetallization.

*Table I*

| | Base catalyst | After chlorination | Final catalyst |
|---|---|---|---|
| P.p.m. NiO | 327 | 327 | 81 |
| P.p.m. $V_2O_5$ | 4,320 | 3,202 | 3,202 |
| Percent Fe | 0.288 | 0.218 | 0.218 |
| Percent $Cl_2$ | ~0.008 | 1.3 | 0.005 |
| R.A. | 34.2 | | 47.0 |
| G.F. | 1.62 | | 1.22 |
| C.F. | 1.25 | | 1.01 |
| Gas gravity | 1.10 | | 1.31 |

EXAMPLE IV

This example illustrates the use of the high temperature treatment of the invention with aqueous oxidation of sulfides.

A 600 gram sample of the base poisoned catalyst Q was air treated for 2 hours at 1300° F., sulfided for 1 hour with $H_2S$ at 1150° F. and oxidized with an $HNO_3$ aqueous solution through which air was bubbled. The filter cake from the $HNO_3$ treatment was divided into 3 equal parts. The first portion IV*a* was washed on the filter with 1 liter of 72° F. water, slurried 10 minutes in 1 liter 180° F. water, filtered and again washed with 1 liter 72° F. water on the filter. The filter cake was slurried 10 minutes at 180° F. in 800 ml. NH$_4$OH solution (10 lbs. NH$_3$/ton catalyst) washed in the manner described, dried and calcined. The second portion IV$b$ was washed on the filter with 3 liters 72° F. water before and after the same type of NH$_4$OH leaching as above. The third sample IV$c$ was prepared in the same manner as was IV$b$ except that the water used for displacement washing was preheated to 180° F. Results obtained are shown in Table II below.

*Table II*

| Sample No | IVa | IVb | IVc |
|---|---|---|---|
| Washing: | | | |
| Method | (1) | (2) | (2) |
| Vol. wash water, ml | 3,000 | 3,000 | 3,000 |
| Wash temp., ° F | 72/130/72 | 72 | 180 |
| Analysis: | | | |
| P.p.m. Fe | 2,100 | 2,080 | 2,045 |
| P.p.m. NiO | 137 | 139 | 137 |
| P.p.m. V$_2$O$_5$ | 3,265 | 3,345 | 3,287 |
| Percent metals removal: | | | |
| Fe | 22.6 | 23.4 | 24.8 |
| NiO | 60.5 | 59.9 | 60.5 |
| V$_2$O$_5$ | 27.3 | 25.6 | 26.8 |
| Test cracking: | | | |
| R.A | 47.6 | 45.7 | 47.2 |
| D+L | 39.1 | 38.5 | 39.0 |
| G.F | 1.50 | 1.54 | 1.44 |
| C.F | 1.20 | 1.24 | 1.22 |
| Gas gravity | 1.13 | 1.10 | 1.16 |

¹ Reslurry.
² Displacement.

EXAMPLE V

Although it is frequently possible to demetallize catalysts without the use of the high temperature treatment with oxygen-containing gas of this invention, vanadium removal is drastically improved when this invention is employed. This improvement is illustrated in the following example.

A batch of base poisoned catalyst S, which was equivalent to base catalyst Q but poisoned to a slightly different metals level was divided into several parts, each of which was given an ammonium wash under the conditions described in Table III. This wash was preceded, except in the case of sample 57, by a treatment with air in a muffle furnace, the conditions of which are also given in Table III.

*Table III*

| Sample | Base cat. S | 57 | 62 | 66 | 67 | 24 |
|---|---|---|---|---|---|---|
| Air treatment: | | | | | | |
| Time | | | 4 | 4 | 4 | 1 |
| Temp. (° F.) | | | 1,000 | 1,300 | 1,400 | 1,500 |
| NH$_4$+ wash: | | | | | | |
| Lbs. NH$_3$/ton catalyst | | 20 | 20 | 20 | 20 | 20 |
| Time (minutes) | | 30 | 30 | 30 | 30 | 30 |
| Temp. (° F.) | | 212 | 212 | 212 | 212 | 212 |
| V$_2$O$_5$ Content | 4,220 | 3,872 | 3,692 | 2,733 | 2,285 | 1,714 |
| Percent V$_2$O$_5$ removed | | 8.3 | 12.5 | 35.2 | 45.2 | 59.4 |

It will be observed from the data reported in Table III that treatment of the catalyst with the oxygen-containing gas is especially effective at a temperature of over about 1200° F. and at least about 50° F. higher than the 1100° F. regeneration temperature.

Another batch of the base catalyst S was treated with air for one hour at 1500° F. and then treated with dilute ammonia water containing 20 pounds NH$_3$ per ton of catalyst for 30 minutes at 212° F. A portion of this treated batch was sent to test cracking of feedstock B with the results reported in Table IV, while the remaining catalyst of the batch was subjected to a repeated air-ammonium wash treatment. A portion of the treated catalyst was used for test cracking of feedstock B while the remainder was again treated with air and ammonia water as before and again divided, etc. Table IV reports the results of these repeated treatments on vanadium removal and cracking results.

*Table IV*

| Sample | Base cat. S | 16 | 20 | 29 | 37 |
|---|---|---|---|---|---|
| No. of treatments | None | 1 | 2 | 3 | 4 |
| V$_2$O$_5$ Content | 4,220 | 1,547 | 1,231 | 1,028 | 962 |
| Percent of residual V$_2$O$_5$ removed | | 63.4 | 20.4 | 16.5 | 6.4 |
| Cumulative percent V$_2$O$_5$ removed | | 63.4 | 70.8 | 75.5 | 77.1 |
| Cracking results: | | | | | |
| Percent gasoline | 22.7 | 24.2 | 25.3 | 25.0 | 24.6 |
| Percent gas | 15.6 | 16.3 | 15.5 | 17.3 | 18.8 |
| Percent coke | 3.2 | 3.1 | 3.0 | 3.0 | 3.7 |
| Percent conversion | 41.5 | 43.6 | 43.8 | 45.3 | 47.1 |
| Gas gravity | 1.02 | 1.21 | 1.20 | 1.28 | 1.27 |
| R.A | 34.8 | 39.3 | 39.4 | 43.0 | 46.8 |
| D+L | 33.1 | 35.5 | 35.5 | 37.2 | 38.8 |
| G.F | 1.68 | 1.35 | 1.28 | 1.26 | 1.27 |
| C.F | 1.28 | 1.12 | 1.07 | 0.99 | 1.10 |

These results show the vanadium removal attainable by repeated treatments and also show the remarkably beneficial effects of vanadium removal from the catalyst on cracking results. It is noteworthy that percent conversion and relative activity of the cracking increase steadily with further removal of vanadium poisons from the catalyst.

EXAMPLE VI

This example shows high temperature treatment with oxygen-containing gas employed with chlorination and washing with an aqueous medium for demetallization. Base catalyst T was similar to catalyst Q in composition and had been poisoned in cracking feedstock A to 327 p.p.m. NiO$_2$, 4240 p.p.m. V$_2$O$_5$ and 0.270% Fe. After regeneration to a carbon content of 0.24%, this catalyst was treated for 17 hours by air at 1150° F. and then sulfided by contact with H$_2$S for 1½ hours at 1150° F. The catalyst was divided into samples 14 and 17 and each sample treated with a different chlorine and methane mixture at 600° F. After the chlorination treatment, each catalyst sample was quickly washed with water and dried and calcined. Table IV below gives the amount of chlorinating agent based on the weight of catalyst sample as well as the metals removal by each treatment and the results obtained when each treated catalyst sample, as well as base catalyst T, was used in a test cracking procedure on feedstock B.

*Table V*

| Sample | Base cat. T | 14 | 17 |
|---|---|---|---|
| Chlorinating agent: | | | |
| Wt. percent Cl$_2$ | | 26 | 13 |
| Wt. percent CH$_4$ | | 1 | 5 |
| Percent metals removal: | | | |
| Ni | | 66 | 65 |
| V | | 17 | 15 |
| Fe | | 16 | 18 |
| Test cracking: | | | |
| R.A | 34.6 | 41.5 | 43.7 |
| D+L | 33.1 | 36.5 | 37.5 |
| G.F | 1.62 | 1.29 | 1.28 |
| C.F | 1.30 | 1.04 | 0.93 |
| Gas gravity | 1.08 | 1.27 | 1.27 |

It is claimed:
1. A method for removing vanadium from a synthetic gel, silica-based catalyst which has been poisoned by contamination with vanadium due to use of said catalyst in cracking at elevated temperature a hydrocarbon feedstock containing vanadium, said cracking including a catalytic cracking zone and a catalyst regeneration zone between which the catalyst is cycled and in which cracking zone the catalyst becomes contaminated with vanadium of said hydrocarbon feedstock and in which regeneration zone carbon is oxidized at an elevated temperature and thereby removed from the catalyst, which comprises bleeding a portion of the vanadium-contaminated catalyst from the cracking system, contacting bled, substantially carbon-free catalyst for at least about 15 minutes with a gas-containing molecular oxygen at a temperature of at least about 1150° F., but below a temperature deleterious to the catalyst to increase subsequent vanadium removal from said catalyst, discontinuing contact with said gas containing molecular oxygen, subsequently removing vanadium from the oxygen-treated catalyst at a temperature of up to about 1000° F. without undue deleterious change in the physical and chemical characteristics of the catalyst, and returning resulting devanadized catalyst to a hydrocarbon cracking system.

2. The method of claim 1 in which the contact with gas containing molecular oxygen is at about 1350 to 1600° F.

3. The method of claim 1 in which the catalyst is silica-alumina.

4. The method of claim 1 in which said subsequent removal of the vanadium is accomplished through conversion of the vanadium to a compound selected from the group consisting of volatile vanadium salts and vanadium compounds dispersible in an aqueous medium.

5. The method of claim 4 in which the catalyst is silica-alumina.

6. The method of claim 4 in which the conversion to a vanadium compound is by contact with a chlorinating agent at a temperature of up to about 1000° F., and the chlorinating agent-treated catalyst is washed with a liquid aqueous medium.

7. The method of claim 1 in which the preliminary contact with gas containing molecular oxygen is continued at fluidizing velocity for a period of about 0.5 to 24 hours.

8. The method of claim 1 in which the catalyst is silica-alumina.

9. The method of claim 1 in which the preliminary contact with gas containing molecular oxygen is at a temperature at least about 50° F. higher than the regeneration temperature and at a temperature of about 1150 to 1600° F.

10. A method for removing metals from a synthetic gel, silica-based catalyst which has been poisoned by contamination with nickel and vanadium due to use of said catalyst in cracking at elevated temperature a hydrocarbon feedstock containing said poisoning metals, the cracking system comprising a catalytic cracking zone and a catalyst regeneration zone between which the catalyst is cycled and in which cracking zone catalyst becomes contaminated with said poisoning metals of said hydrocarbon feedstock, and in which regeneration zone carbon is oxidized at an elevated temperature and thereby removed from the catalyst, which comprises bleeding from the conversion system a portion of the nickel and vanadium contaminated catalyst containing less than about 10,000 p.p.m. poisoning metals measured as the common oxides, contacting the bled, substantially carbon-free catalyst for at least about 15 minutes with a gas containing molecular oxygen at a temperature of at least about 1150° F. but below a temperature deleterious to the catalyst and at least about 50° F. higher than the regeneration temperature to increase subsequent vanadium removal from said catalyst, sulfiding oxygen-containing gas-treated catalyst by preliminary contact with hydrogen sulfide vapor at a temperature of about 800–1500° F. to increase nickel removal from said catalyst, subsequently removing vanadium from the sulfided catalyst at a temperature of up to about 1000° F. without undue deleterious change in the physical and chemical characteristics of the catalyst, removing nickel from the sulfided catalyst by contact with a liquid aqueous medium, and returning resulting demetallized catalyst to a hydrocarbon cracking system.

11. The method of claim 10 in which the catalyst is silica-alumina.

12. The method of claim 10 in which the $H_2S$-treated catalyst is contacted with a chlorinating agent at a temperature of up to about 1000° F. to convert vanadium and nickel to the chloride form.

13. The method of claim 12 in which the chlorinating agent-treated catalyst is washed with an aqueous medium after the chlorinating agent treatment.

14. A method for removing metals from a fluidizable synthetic gel, silica-based catalyst which has been poisoned by contamination with nickel and vanadium due to use of said catalyst in cracking at elevated temperature a hydrocarbon feedstock containing said poisoning metals, the cracking system comprising a catalytic cracking zone and a catalyst regeneration zone between which the catalyst is cycled and in which cracking zone the catalyst becomes contaminated with said contaminants of said hydrocarbon feedstock, and in which regeneration zone carbon is oxidized at an elevated temperature and thereby removed from the catalyst, which comprises bleeding from the cracking system a portion of the nickel and vanadium contaminated catalyst, containing less than about 10,000 p.p.m. poisoning metals measured as the common oxides, contacting the bled, substantially carbon-free catalyst for at least about 15 minutes with a gas containing molecular oxygen at a temperature of at least about 1150° F., but below a temperature deleterious to the catalyst and at least about 50° F. higher than the regeneration temperature to increase subsequent vanadium removal from said catalyst, sulfiding oxygen-containing gas-treated catalyst by preliminary contact with hydrogen sulfide vapors at a temperature of about 800 to 1500° F. to increase subsequent nickel removal from said catalyst, contacting the sulfided catalyst with a chlorinating agent at a temperature of up to about 1000° F. to convert vanadium and nickel to the chloride form and vaporize vanadium chloride, contacting chlorinating agent-treated catalyst with a liquid aqueous medium to dissolve nickel chloride from the catalyst and returning to a hydrocarbon cracking system the resulting demetallized catalyst without undue deleterious change in its physical and chemical characteristics.

References Cited in the file of this patent

UNITED STATES PATENTS

| | | |
|---|---|---|
| 2,481,253 | Snyder | Sept. 6, 1949 |
| 2,618,613 | Kimberlin et al. | Nov. 18, 1952 |
| 2,769,687 | Porter et al. | Nov. 6, 1956 |
| 2,934,497 | Bieber et al. | Apr. 26, 1960 |
| 2,977,323 | Johnson et al. | Mar. 28, 1961 |

FOREIGN PATENTS

| | | |
|---|---|---|
| 1,040,723 | Germany | Oct. 9, 1958 |